United States Patent [19]
Skolnick et al.

[11] Patent Number: 5,181,355
[45] Date of Patent: Jan. 26, 1993

[54] FRAME SUPPORT FOR PANELED SCREENS AND LIKE STRUCTURES

[75] Inventors: Leonard P. Skolnick, Chatham; Joseph D. Clinton, West Chester, both of Pa.

[73] Assignee: 3-D Structures, Inc., Avondale, Pa.

[21] Appl. No.: 797,547

[22] Filed: Nov. 25, 1991

Related U.S. Application Data

[62] Division of Ser. No. 597,113, Oct. 12, 1990, Pat. No. 5,097,640.

[51] Int. Cl.$^5$ ............................................... E04B 1/32
[52] U.S. Cl. .................................... 52/80; 52/82; 403/385; 403/391
[58] Field of Search ........................... 52/80–82; 403/391, 399, 400, 385

[56] References Cited

U.S. PATENT DOCUMENTS

| | | | |
|---|---|---|---|
| 2,787,775 | 4/1957 | Sorflaten et al. | 403/391 X |
| 3,006,669 | 10/1961 | Novales | 403/385 X |
| 3,325,228 | 6/1967 | Lien | 403/391 X |
| 4,040,916 | 8/1991 | Morgan | 403/400 X |
| 4,753,404 | 6/1988 | Grandclement | 403/391 X |

Primary Examiner—Richard E. Chilcot, Jr.
Attorney, Agent, or Firm—Dann, Dorfman, Herrell and Skillman

[57] ABSTRACT

A frame for a projection screen or the like may be fabricated of elongated round tubular members running one direction and polygonal (preferably rectangular) cross section members running in the other direction connected together into a grid by clamps at their intersections. The clamps are parallel plates affixed to the parallel surfaces of the polygonal support members and have a rounded groove in an edge generally conforming to the rounded cross section. Clamp means to hold the round members in the grooves are conveniently formed of U-bolts which are secured to flanges generally normal to the planar surfaces of the bracket. The frame is particularly useful for compound curved surfaces including generally spherical domes. In such configurations the rectangular elongated support members are arranged as latitudes and the round section members as longitudes outside of the rectangular members. Panels may be designed with proper curvature to have their edges mounted directly on the longitudinal frame member and butt against other panel edges supported on the frame member. An alternative form of mounting provides a flexible resilient support member supported at multiple support points from a supporting frame member and having at least one adjustable member connecting it to that support member whereby at least the radial dimension can be changed to change the curvature of the flexible members.

12 Claims, 12 Drawing Sheets

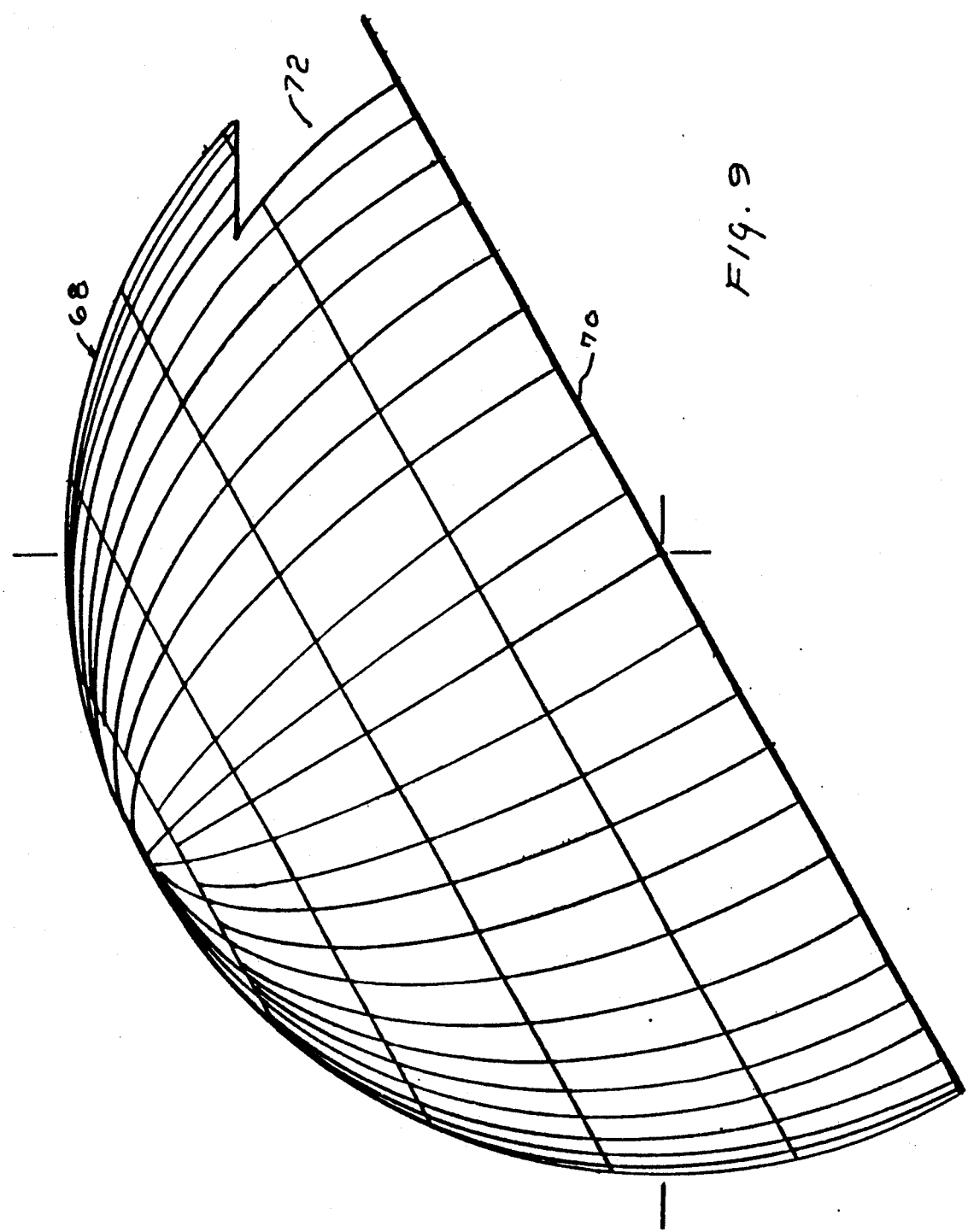

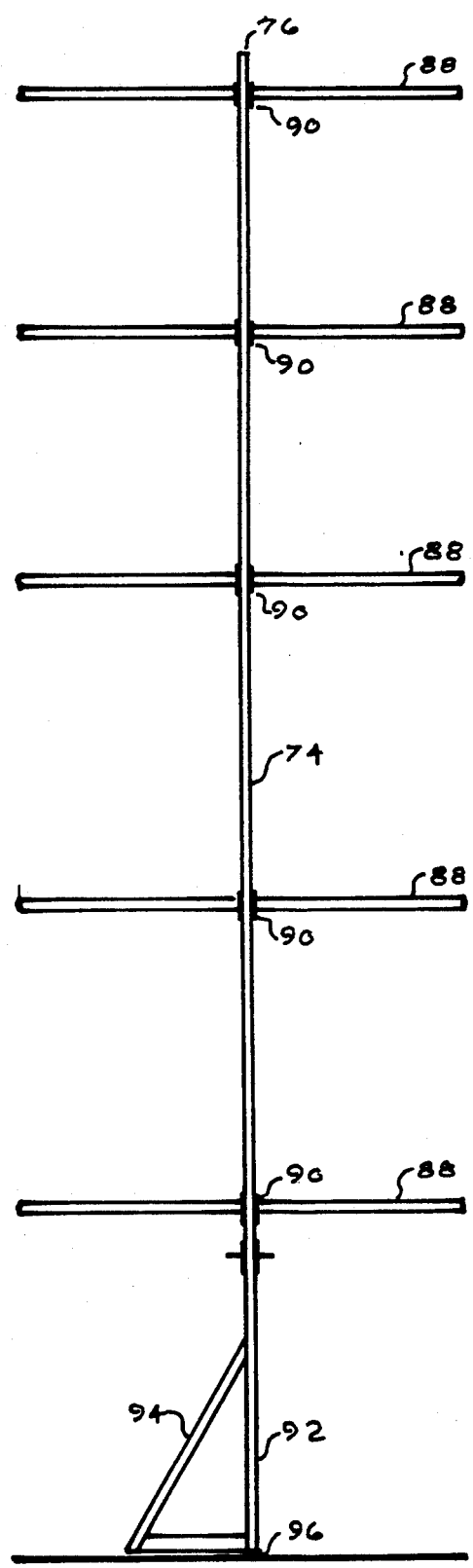
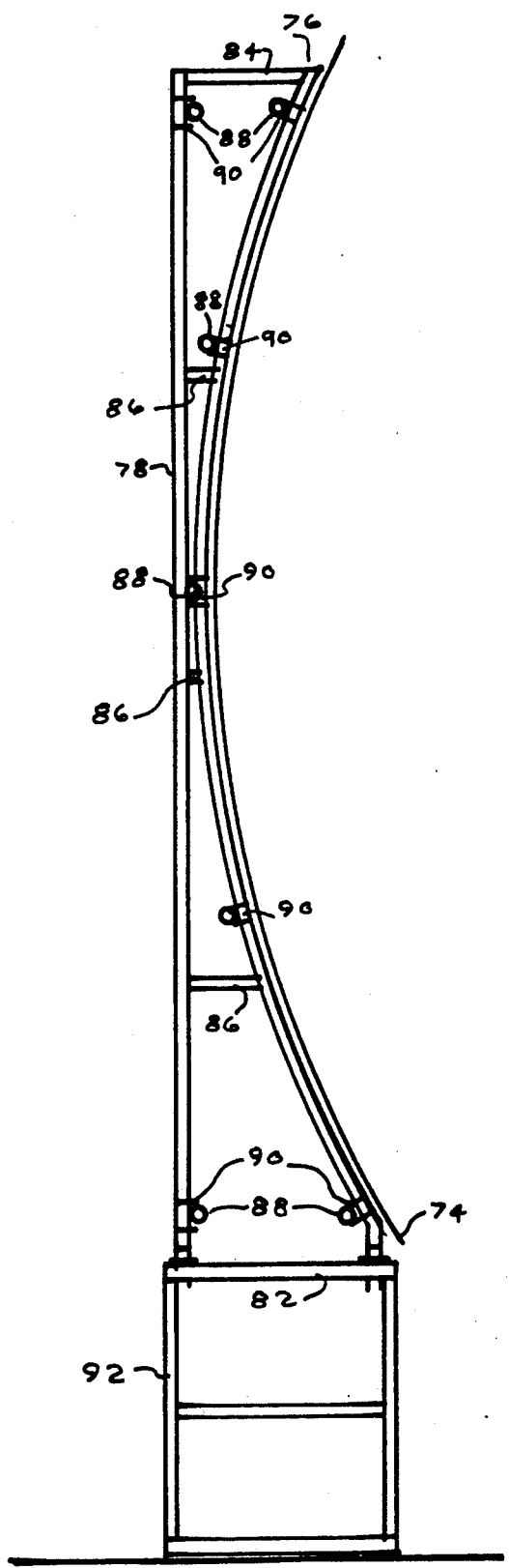
FIG. 10
FIG. 11

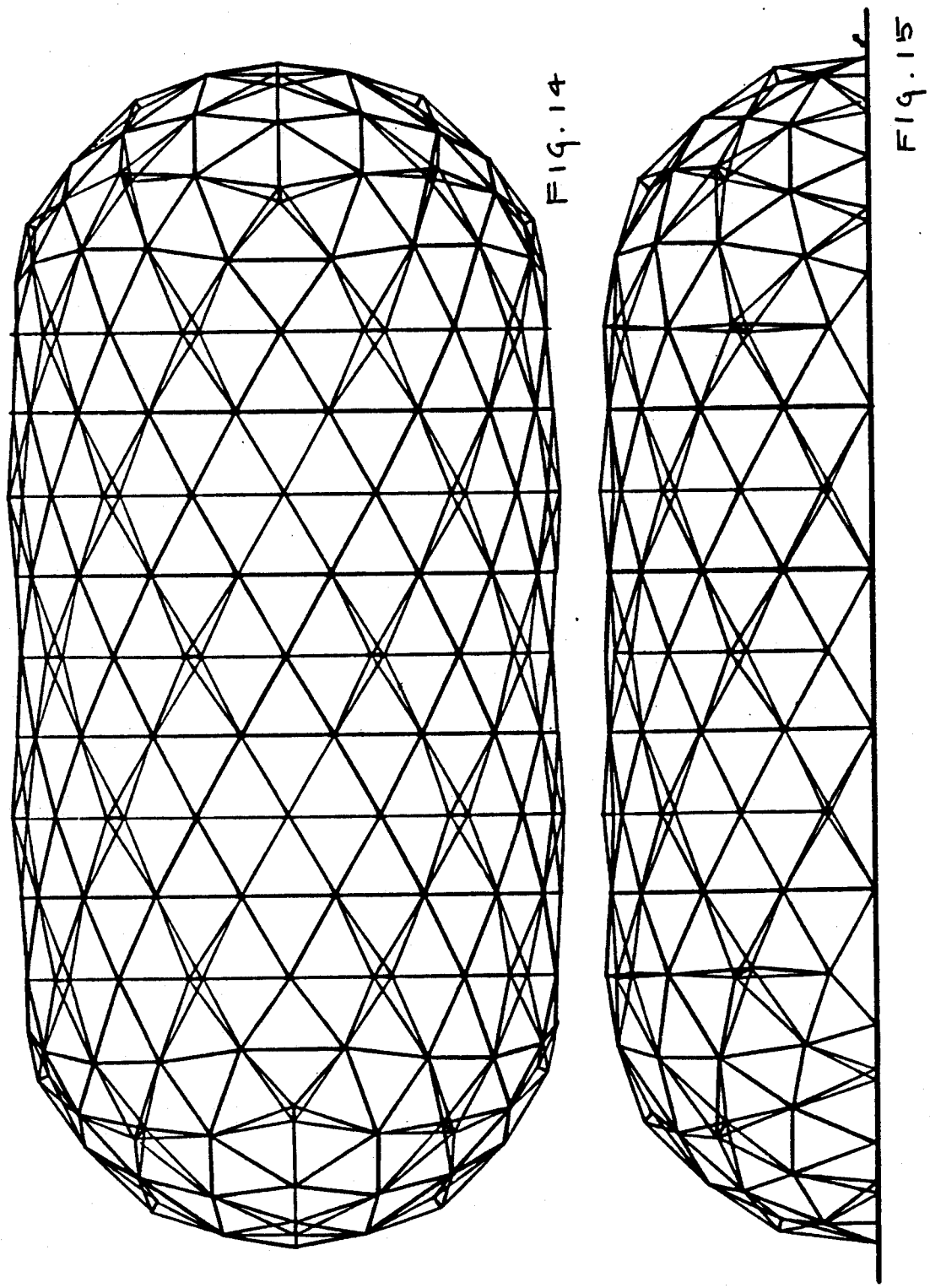

FRAME SUPPORT FOR PANELED SCREENS AND LIKE STRUCTURES

This is a division of co-pending application Ser. No. 597,113 filed Oct. 12, 1990 now U.S. Pat. No. 5,097,640.

The present invention relates to a structural support for a curved surface such as a projection screen. The invention has particular relevance and usefulness in connection with structures for supporting domes or enclosing screens.

BACKGROUND OF THE INVENTION

Planetarium domes and domes for projection of other types of displays have evolved in the prior art from relatively small structures composed of individual self-supporting segmented panels to much larger structures wherein a frame and intermediate support structure must be provided for the individual panels of the dome. Techniques have been developed for producing screen segments and desired curvatures which are designed to be fitted together with a high degree of precision. However, supports for such screens have often been unsatisfactory from a standpoint of the precision desired in achieving a predetermined curvature and in any event have been awkward and difficult to build. In particular, dome support constructions which have been fabricated as a gridwork of structural numbers are themselves difficult to fit together and often very difficult to interconnect at junctions using conventional fastening means. Moreover, distortions in the screen surface may result from trying to conform the screen too closely to a support frame structure. Either the support structure is not built to conform sufficiently closely to the screen shape so that distortion occurs in attempting to make the screen conform, or the support structure is built in such a way that the support pieces themselves do not fit together properly so that the screen cannot conform to the support, or the screen pieces will not be adequately supported on the frame.

THE ADVANCE IN THE ART

The present invention relates to a number of improvements in the structural support of curved screens, and particularly to structural support for compound curved screens. It uses for the first time grid members which are elongated structural support pieces of different cross sections. In particular, it uses grid members which in one direction are of generally polygonal cross section and in the other direction are of generally rounded construction. It provides novel brackets for interconnecting these grid members which are transverse to one another at highly variable angles at various intersections such that the bracket pieces are fitted to both structural pieces and provide rigid secure connections between the intersecting members without distortions of the individual pieces of the entire frame. The nature of the interconnection using brackets of the present invention permits complete flexibility in accommodating to all possible orientations between the structural members interconnected.

The frame of the present invention, while particularly useful in dome structures need not provide a complete dome, nor indeed need it even be a spherical segment. The frames can also be used as support frames for outer shells or more commonly as part of such support structure for the exterior of a building, for example.

Just as the present invention provides means for attaching the elongated structural members together without distortion, the frame created in this manner, or other types of frames, may be provided with novel means in accordance with the present invention for adjusting curvatures in small amounts to provide a precision surface on which a screen may be mounted for example. The device can be used to provide curvature corresponding to the screen even when the frame employed uses straight supporting members. This is accomplished using an elastic deformable strip as the screen mounting structure within its elastic limit and adjusting periodic points along the length to make the strip conform to the shape of the screen.

More specifically, the present invention broadly relates to a support frame for supporting a screen of similar surface usually composed of many panels. To construct a compound curve surface, the frame may consist of a plurality of curved elongated structural members. First structural members are of generally rounded cross section arranged generally parallel to one another in one direction. A plurality of curved elongated second structural members of generally rectangular cross section are arranged transverse to first structural members to form a gridwork therewith. Means is provided securing the first and second elongated structural members rigidly together at their intersections in the grid.

The grid may be configured as a dome with the first structural members of generally rounded cross section arranged in the position of latitudes and the second structural members of generally rectangular configuration arranged as longitudinal members. In this configuration panels of suitable dimensions may be rigidly secured along the edges to two longitudinal members. A supporting member of any shape may be adapted to support a curved panel using adjustment means spaced periodically along a supporting member and an elastically deformable resilient strip with the strips being adjusted to conform to the panel shape.

Also in accordance with the invention the preferred means for securing polygonal cross section structural members to rounded cross section structural members comprises a pair of bracket members. The bracket members have planar surfaces for application to surfaces of the polygonal cross section, each having one edge remote from the supporting cross section structure member cut out to form a rounded receptacle generally conforming to the rounded cross section structural member and clamp members cooperating with each of the bracket members to engage and hold the rounded cross section structural members in place in the rounded groove.

DRAWINGS OF A PREFERRED EMBODIMENT

FIG. 9 shows a frame generally similar to that of FIGS. 1 and 2 but having a tilted equator;

FIG. 10 shows a front elevational view of a portion of a frame support for a curved screen or a reflector, not of the domed type;

FIG. 11 is a side elevational view of the structure of FIG. 10;

FIG. 14 is a plan view from above of a geodesic housing of an elongated form which combines two spherical and one cylindrical form;

FIG. 15 is a side elevational view of the structure of FIG. 14;

Figure 1:
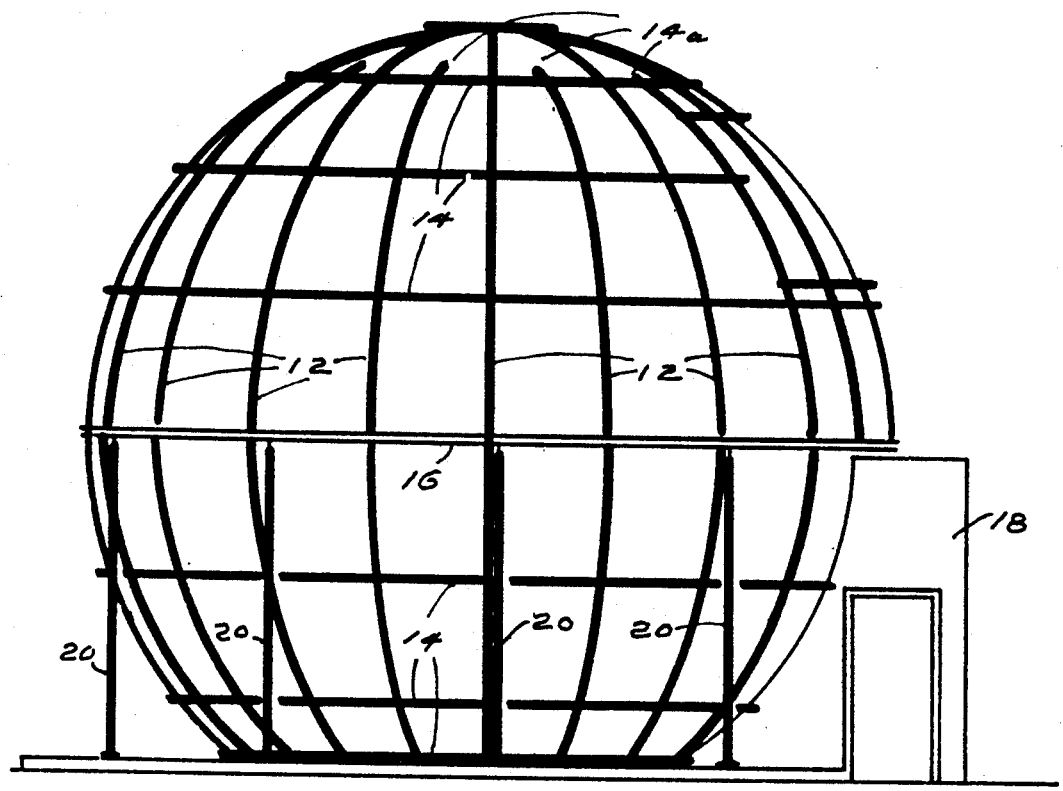
FIG. 1 is a side elevational view of a frame for a spherical screen in accordance with the present invention.
Figure 2:
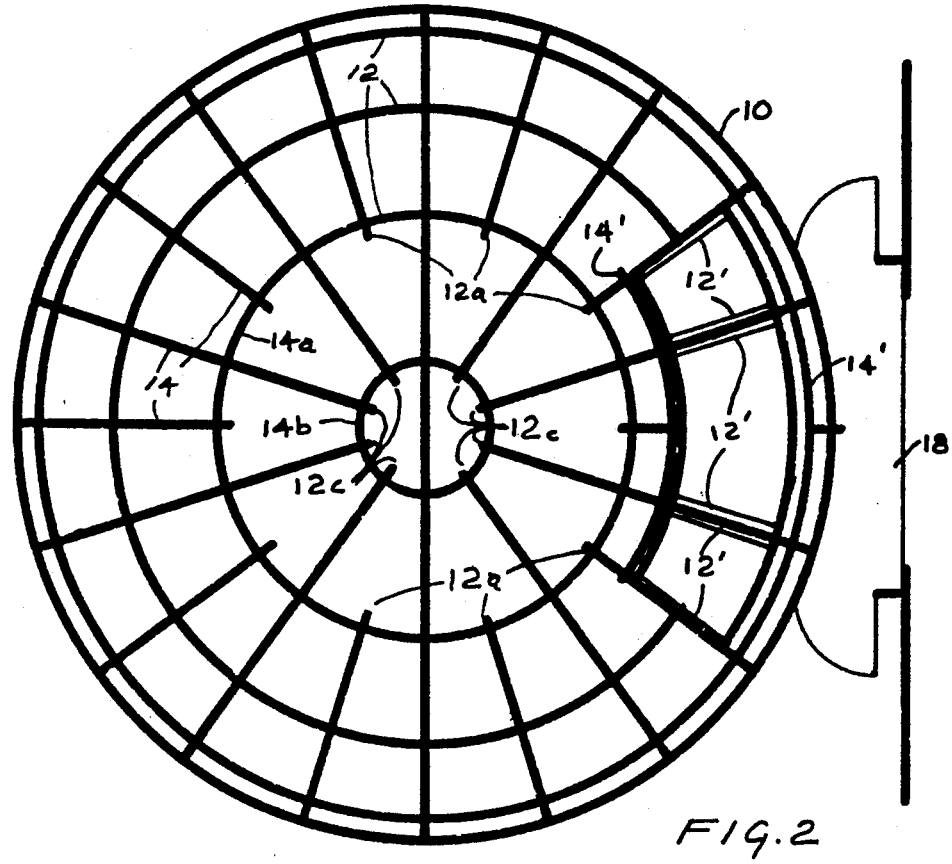
FIG. 2 is a plan view from above of the spherical screen frame of FIG. 1.

Referring to FIGS. 1 and 2, a novel frame structure generally designated 10 suitable for supporting a dome screen is illustrated. The screen can be supported from this frame structure in the form of a portion of a sphere. As will be apparent from the drawing, the frame provides for more of a spherical surface than a hemisphere.

It has become common in the prior art to provide a support frame composed of similar structural elements, commonly hollow rectangular beams, all bent along one surface to provide circular arcs all having as a circular radius essentially that of the desired screen. Some members of such a grid structure are capable of supporting directly what might be described as wedge shaped segments of the spherical screen mounted directly to the curved surface of the beams.

Self-supporting domes having flanged screen sections were also popular, particularly for smaller domes. Hybrid screen arrangements employing flanged and flat edge screen sections could be used as well.

The principal problem with the frame structures of the prior art was that the elongated structural members had to be formed into some sort of a grid. This proved to be a rather awkward task, particularly since there was a persistent tendency to form the structural members as arcs of great circles of the spherical structure being formed. Intersections of these structural members were frequently awkward to design and fabricate. Moreover such junctions or intersections frequently resulted in some distortion of the frame structure from the intended form, spherical or otherwise.

In the present invention great circle segments are still employed using rectangular or other polygonal cross sectioned tubing to form curved support members 12 arranged in the positions of longitudinal elements of the sphere. The criterion of maintaining the great circle configuration of the transverse support members completing the supporting the grid work has been eliminated, however. Moreover, no effort is made to keep the grid work intersections in common planes with one another. In accordance with the present invention a preferred arrangement for a spherical dome frame is to place the transverse elongated support members 14 in the position of latitude elements of the spherical form. Such structural modification necessitates departing from the same curvature since each latitude requires a circular support of different radius which decreases with increasing latitude from the equator. Also under the circumstances were rectangular tubing to be used, a further complication would be introduced since the square faces of the rectangular tubing would be at increasing angles to the longitudinally arranged support members 12 or alternatively the rectangular cross section members would have to be fabricated in some sort of a twisted mode to present a relatively flat face to the relatively small curvature of the longitudinally arranged structures. Consequently in accordance with the present invention it is preferred not to use rectangular cross section members for the latitudinally arranged elements, but to instead use pieces of rounded, and preferably circular, cross section, such as conventional round tubing. Bending of the round tubing poses little problem. However, connection between structural pieces of different cross section remains something of a problem which has been solved by the present invention. No attempt it made to keep the round and rectangular members in common planes. In the FIGS. 1 and 2 arrangement the round members are outside the rectangular members.

As seen in FIG. 1, the equatorial member 16 may be formed of a channel shaped member since its equatorial great circle position allows the channel base to fit tangentially along the outer surface of the longitudinal structural members 12 with better contact than would be possible elsewhere. The equatorial member could also be an I-beam or a rectangular section tubular member, if desired, or could be a round tubular section member attached as other round tubular members. It will also be observed that as the longitudinal members 12 approach the pole, they move closer together. For this reason a first group 12a may be terminated at or slightly above latitude member 14a. Then member 12b may be continued right through the pole and effectively continue from a longitude, say at 0° into one at 180°. Other longitudinal members 12c are discontinued a latitude member 14b.

A portion of the spherical structure is also eliminated to accommodate a frame entryway 18 above which the dome frame may be reinforced by doubling some of the longitudinal members, by reinforcing sections 12' and adding additional arcuate tubular sections 14'. If desired, the structural reinforcing members may be in the form of integral box structures of rectangular tubular pieces specifically fabricated on fixtures to fit the frame in the area of the reinforcing structure. Also, instead of relying upon the self-supporting capability of the frame, columns 20 may be connected to the equatorial member 16, for example, and these columns, in turn, may be guyed or cross braced, as is known in the art.

The frame of FIGS. 1 and 2 has the advantage that a precision construction of the longitudinal members should not be materially distorted from the spherical form of the screen and this may be used, if desired, to directly support the screen segments.

Figure 4:
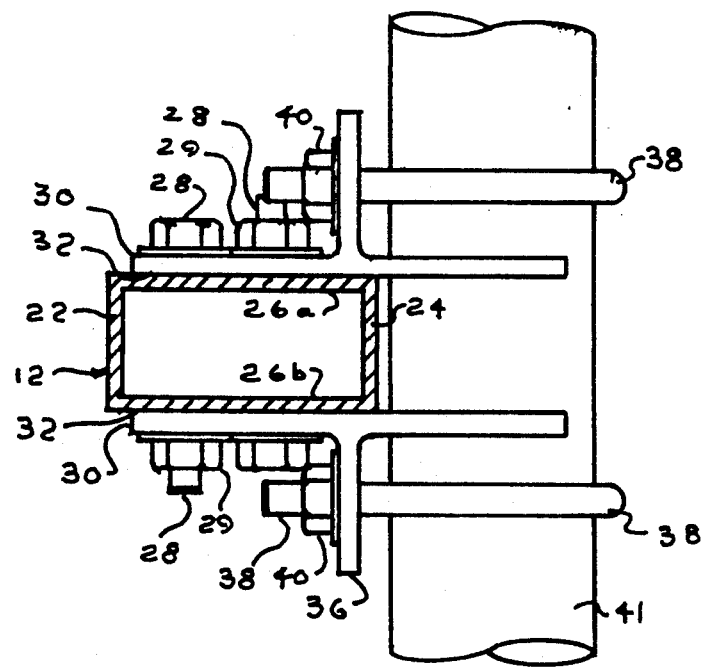
FIG. 4 is a view taken along the line 4—4 of FIG. 3.
Figure 3:
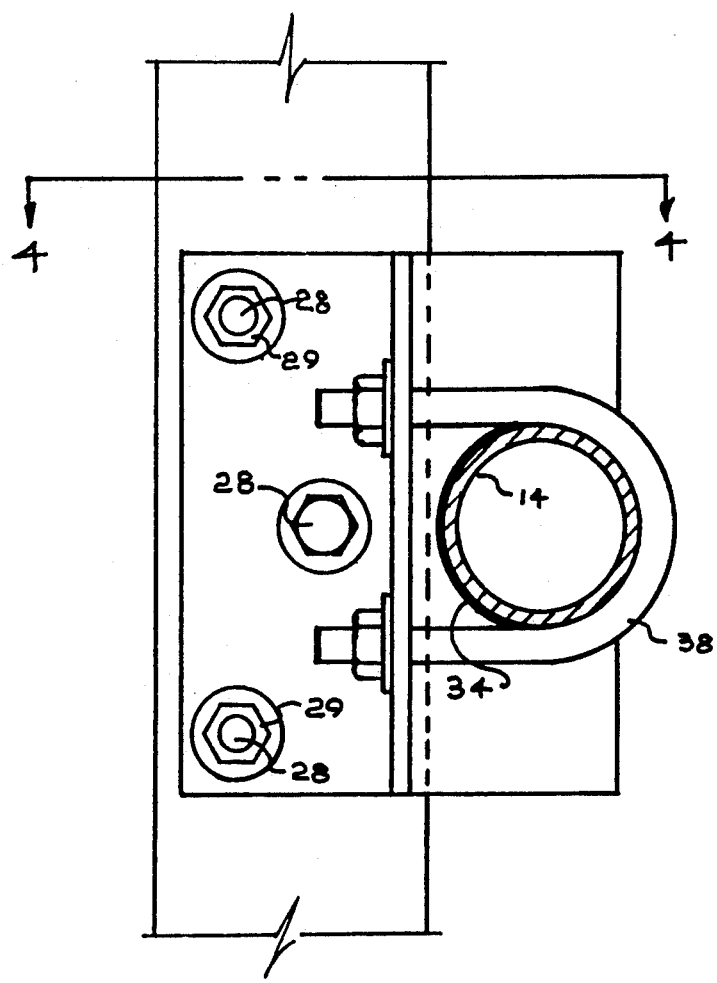
FIG. 3 is a partial sectional view on a much enlarged scale taken along line 3—3 of FIG. 1 of a typical bracket and clamp configuration used to hold the structural members together.

Referring now to FIGS. 3 and 4, a novel coupling device in accordance with the present invention is illustrated. This coupling device enables solid, rigid connection between a square or rectangular cross section and the circular cross section members in order to provide greater strength and rigidity to the frame as a whole. Besides square or rectangular sections the coupling device may be used or other polygonal structures having essentially parallel faces. Assuming the use of rectangular tubing members 12 which need be formed into a great circle curve, it may be desirable to have the inner face of the rectangular member curved to conform to the curvature of the screen to be supported from that face. The outer surface will then also be bent to a circular arc, but the piece is bent so that the sidewalls remain flat and planar. This can be done provided no twisting is undertaken in fabricating the longitudinal frame member from rectangular cross section tubular member. As seen in FIG. 4, the inner wall 22 and the outer wall 24 are curved, but the sidewalls 26a and 26b remain flat and essentially parallel to one another. The applicant takes advantage of these flat walls to support parallel brackets 30. The brackets are fastened to the frame member 12 using bolts 28 parallel to one another, and generally perpendicular to the tubing sidewalls 26a and 26b and the inner surface 32 of flat bracket members 30. The bolts 28 are held in place by nuts 29 in the embodiment seen in FIG. 4 clamping the flat faces 32 of parallel brackets to the parallel faces of rectangular section structural member 12. This construction provides a very strong, secure and rigid connection.

The parallel brackets 30 are themselves sturdy and rigid, preferably do not extend beyond the support surface 22 of the tubular member 12, but do extend outwardly beyond the surface 24. Beyond surface 24 an upper edge is provided with a rounded groove 34, best seen in FIG. 3, preferably of a size and configuration to generally conform to the round cross section of member 14 and preferably as deep or deeper than the diameter of the round cross-section. The brackets are also provided with flanges 36 extending away from the sidewalls 26a and 26b of the rectangular section member 12. Flanges 36 are provided with a pair of holes to accommodate U-bolts 38 which snugly conform to the round cross section structural member 14 held in the rounded grooves 34. The ends of the U-bolts pass through the holes in flanges 36 and are held in place by nuts 40 secured to the threaded ends of the U-bolts and bearing against the flanges 36 on the side opposite the secured round cross section tubing 14 to enable pulling the round cross section members snugly in place against the rounded grooves in the edges of the brackets.

The way in which the screen is supported from the inner surface of the frame has not been specifically discussed, although it will be apparent that suitable dimensioned panels could be secured to the inner edge 22 of the longitudinal members with edges of adjacent panels butted together. Other support techniques will be treated hereafter. It will be understood that various forms of construction may be employed and, in the preferred construction of the frame described, the screen panels will be most commonly supported primarily from the longitudinal members and that the screen panels may be composed of varying size as needed to extend between the longitudinal pieces and butt against adjacent panels supported from the same longitudinal frame members. A concave circular piece of screen is normally employed to provide the polar cap.

Figure 6:
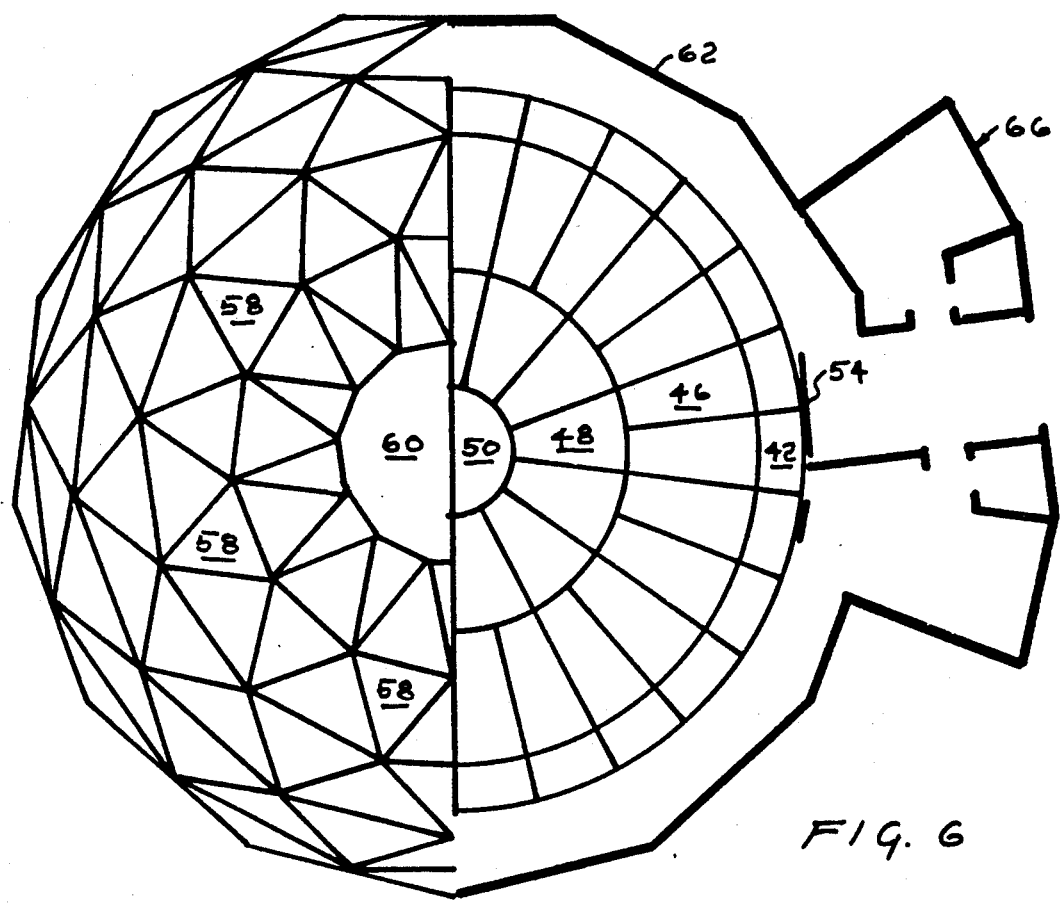
FIG. 6 is a plan view in partial section of the structure of FIG. 5.
Figure 5:
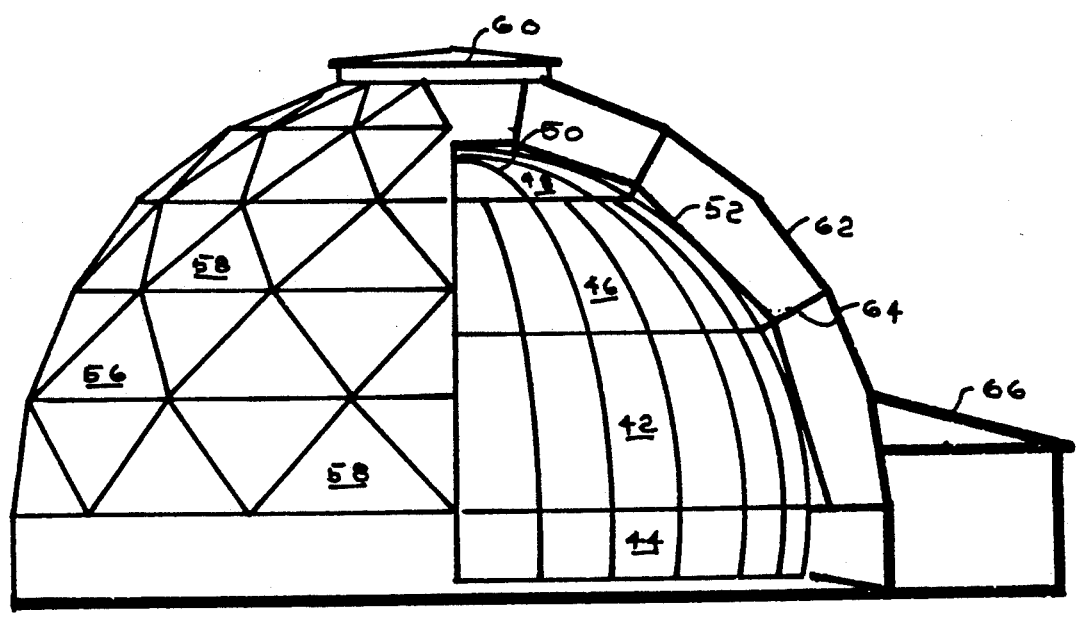
FIG. 5 is a schematic elevational view in partial section showing a frame structure of the general type of FIGS. 1 and 2 within a domed housing.

Referring now to FIGS. 5 and 6, a typical spherical dome configuration is shown with screen panels represented as members in the configuration of panels 42, 44, 46, 48 and 50. A somewhat modified form of supporting frame 52 is shown with an entryway 54 through the frame into the interior of the dome. The frame 52 may be provided with a certain amount of clearance from the outer dome or housing 56. The housing may be, for example, a geodesic dome composed of triangular panels 58 of varying size and shape and a cap 60. Although a geodesic dome is capable of being self-supporting, the structure may all be supported on an outer frame 62 with suitable trussing or interconnecting structure 64 to the dome frame 52. A suitable entryway or vestibule 66 to the outer housing 56 is provided. The configuration of FIGS. 5 and 6 may be suitable for screens 40 feet in diameter, for example.

Figure 8:
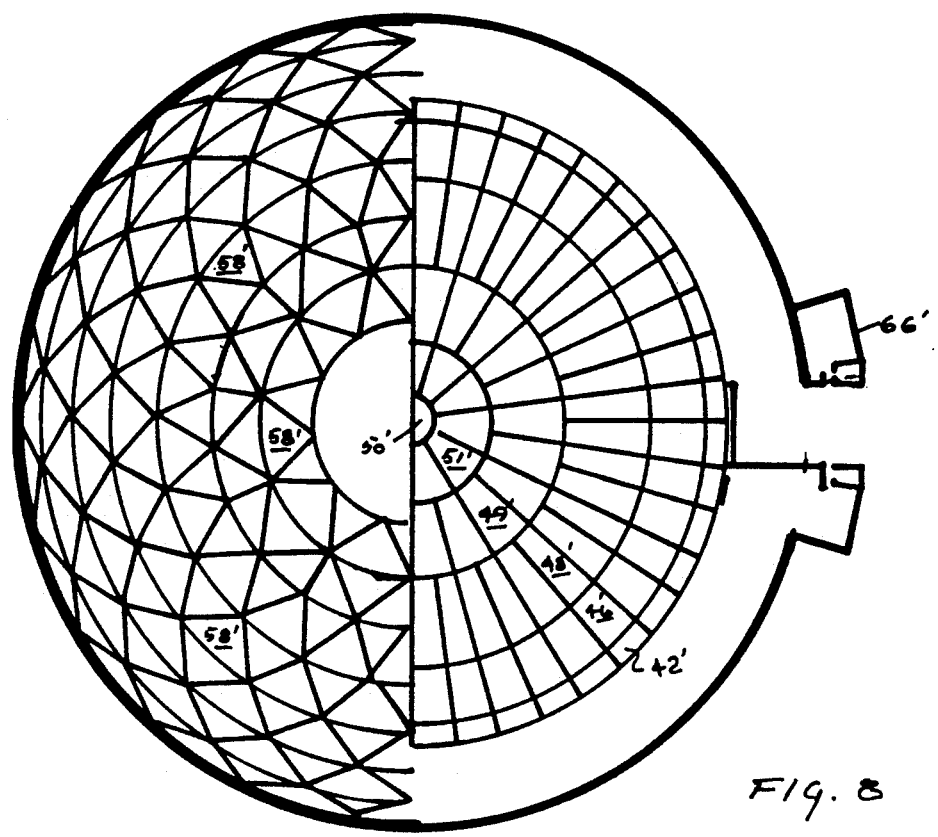
FIG. 8 is a plan view similar in partial section of the structure of FIG. 7.
Figure 7:
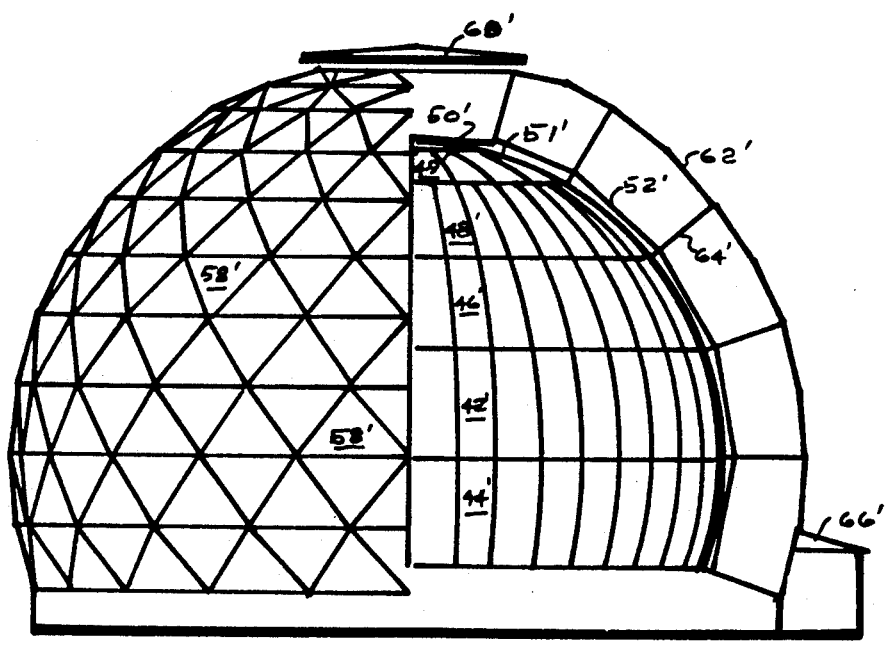
FIG. 7 is a view similar to FIG. 6 of another somewhat larger spherical planetarium structure.

A larger geodesic dome configuration shown in FIGS. 7 and 8 may be suitable for screens up to 20 meters or 65 feet in diameter. The structure is similar to that of FIGS. 5 and 6 but involves more pieces on a somewhat different scale, as will be apparent. Similar pieces in FIGS. 7 and 8 are designated using similar number designators as in FIGS. 5 and 6 with the addition of primes thereto. It should be noted that two additional rows of panels 49 and 51 are required.

FIG. 9 shows a further domed screen configuration, also in the form of a hemisphere, but with the equator 70 tilted to place the pole of the screen 68 at any desired angle and usually providing an opening 72 at the high end of the equator. It will be appreciated, of course, that openings may be provided at other places as well as the one indicated in each of the embodiments shown.

As seen in FIGS. 10 and 11, the applicants' novel clamping device is useful not only for securing the structural pieces in the grids of a dome screen or other spherical surface, but can be used for a straight or simple curved surface, such as a cylindrical surface, or compoundly curved, such as an elipsoidal surface. The structure illustrated may support a concave screen, an antenna reflector, or other curved surface apparatus. The curved surface of the screen 74 is seen in profile and somewhat schematically as being supported on an upright frame structure, generally designated 76, and consisting of a straight vertical member 78 of rectangular tubular cross section, a curved member of rectangular tubular construction which may have spherical, parabolic or other desired curvature and end struts 82 and 84. There may also be a plurality of cross connections 86. Although only one such frame is depicted in FIG. 11 as shown in FIG. 10, it will be seen that the laterally extending longitudinal round tubular members 88, each of which may be identical, will allow the placing in parallel of plurality of frames 76 as shown in FIG.

11. As seen in FIG. 11 the round tubular cross bars 88 may be repeated on both the straight member 78 and the curved member 80 of the frame. The cross bars 88 are preferably round tubes and are connected to each of rectangular sectioned frame members by similar brackets 90 of the type shown in FIGS. 3 and 4, and described in connection therewith. Each of the frame members may be supported on a sub-frame base, generally designated 92, and here shown as a closed rectangular structure with a cross brace. The sub-frame base may assume many other forms and may be guyed by wires 94 to gain lateral stability, the wires being connected in this instance between some portion of the side frame 92 and the ground, using suitable anchors, or the like. The frame 92 may be provided with a pad 96 if it is supported on the surface of the earth or it may be provided with extensions which extend to the earth or a concrete footing in order to provide stability. It will be understood that a structural grid in accordance with the present invention can assume many different forms using a combination of rectangular (or other polygonal) and round cross section tubing or rod.

Figure 12:
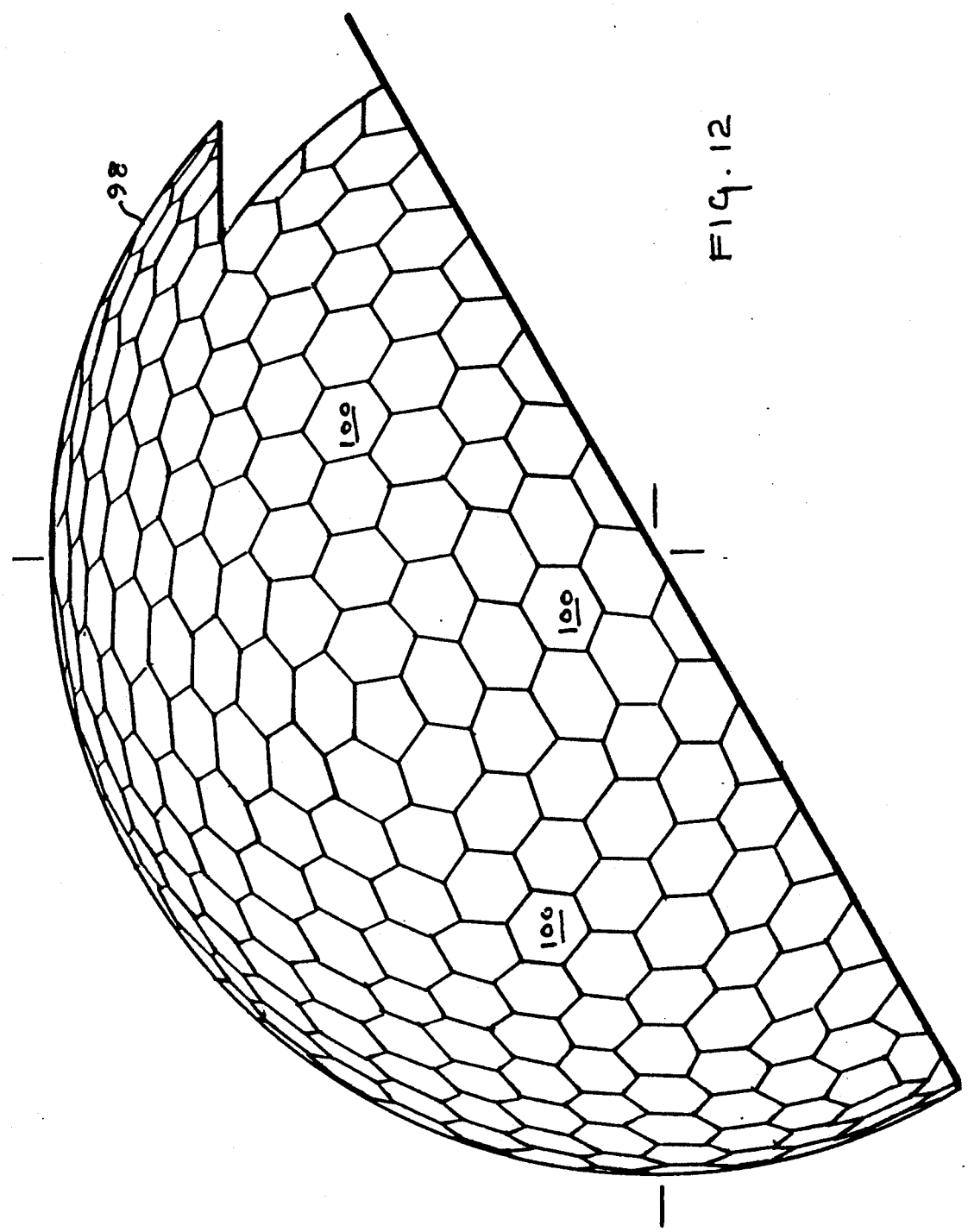
FIG. 12 is a side elevational view of a geodesic dome housing which might be suitable for use with the dome supported on the frame of FIG. 9.
Figure 13:
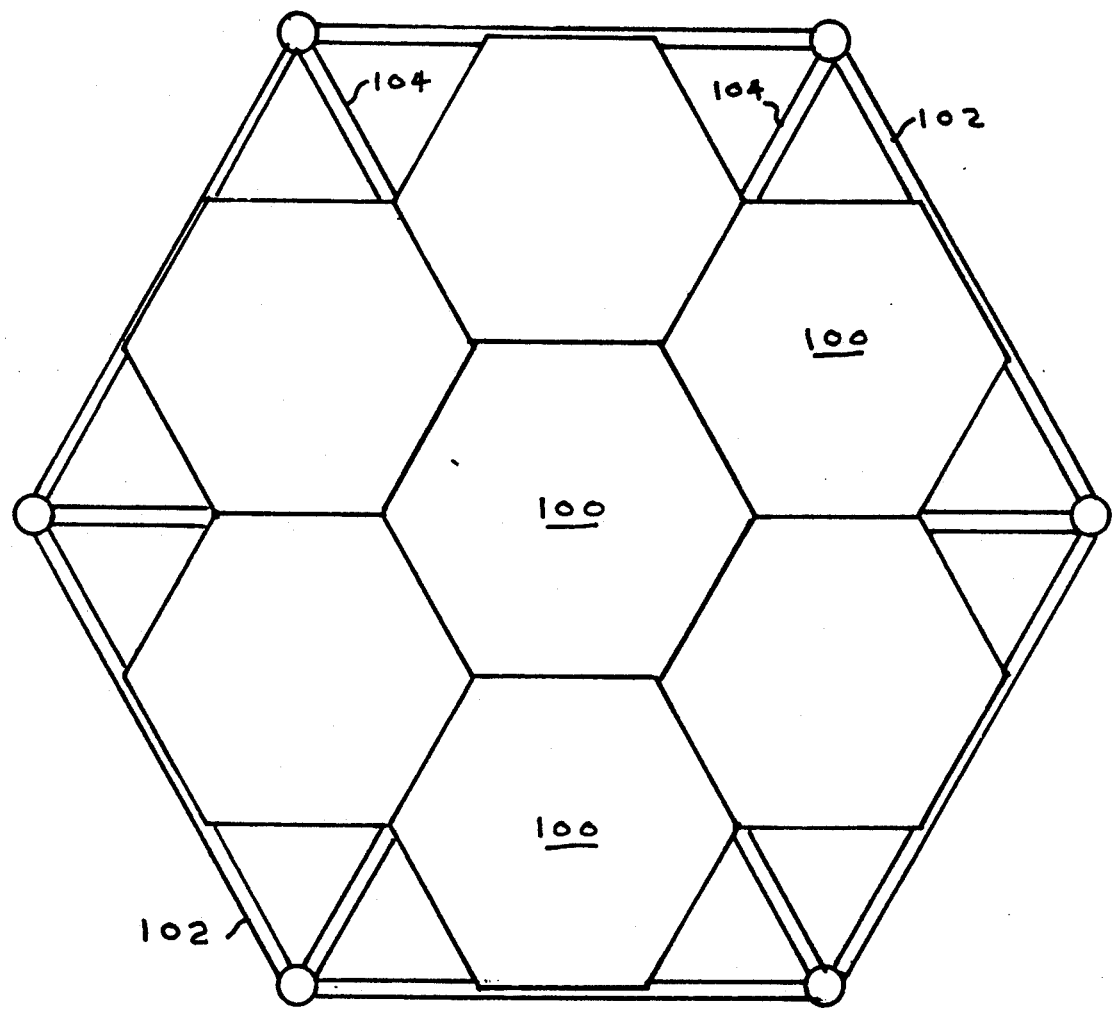
FIG. 13 is a detailed view showing how some panels of the geodesic structure of FIG. 12 may be assembled.

FIG. 12 shows another housing in the form of a geodesic dome 98 using hexagonal and pentagonal panels which may be connected at the various vertices to adjacent panels or support structure. One method of supporting the structure is to provide a plurality of panels as seen in FIG. 13 in a cluster configuration as shown. In this particular form the panels are a pair of adjacent hexagonal frames 102 subdivided into triangular support configurations which are formed by diagonal connectors 104 extending from each apex to a common center. Preassembled panels of this configuration in a single hexagon or a double pattern as shown may be connected at their apeces to other such subframes to build a dense frame and may be used as an outer frame or structure for the covering panels 100 of FIG. 12. Even a hexagon paneled projection dome inside is possible using structures such as that of FIG. 16 or modifications of structures of FIGS. 17–20 using resilient mounting strips to support panels. The frames shown have the advantage that they allow every other edge of some hexagonal panels to be rigidly supported throughout its length. Other panels may rely on being secured at each of their apeces for rigidity. Additional hexagonal panels may be inserted to fill in the blanks between structural pieces. It will be appreciated that similar frames for other polygons such as octagons can be used.

Geodesic structures include variations like that of FIGS. 14 and 15. The structure of FIGS. 14 and 15, for example, may accommodate side by side a pair of dome screens of the type proposed by the present invention or for any other suitable use.

It will be appreciated that other types of housings may be employed in connection with spherical or other simple or compoundly curved domes just as they can be employed with other types of screens. However, the use of geodesic domes or geodesic structures for such purposes has particular appeal since the shape of the internal structure is not unipolar or bipolar, and therefore is not evident as to shape. It will be understood by those skilled in the art that geodesic domes can be constructed using any polyhedral form, more notably icosahedron and the tricontrahedron. The panels may be of many different polygon types. Such a geodesic structure, if the individual panels are rigid, may be self-supporting, provided that the vertices of the panels are all connected to the adjacent vertices composing the panel. Such structures will have inherent triangular bracing to help keep the structure in place.

Figure 16:
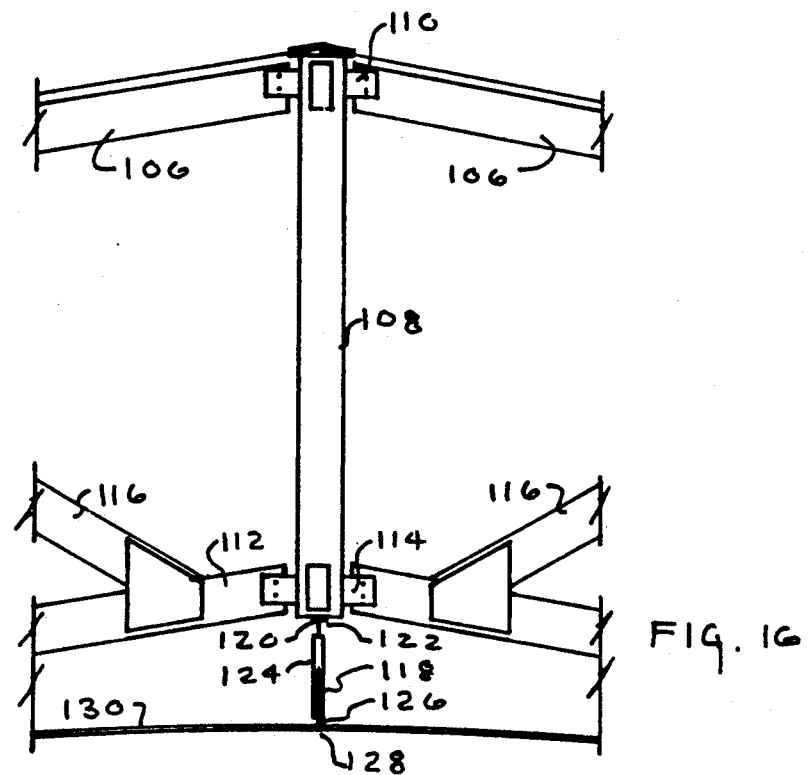
FIG. 16 is a detailed view showing an element of an entirely different kind of support structure using chordal members for an interior dome screen and exterior dome housing and providing an adjustable screen support useful also with frame structures of the present invention.

FIGS. 14 and 15 show an extension to the geodesic theme wherein the geodesic buildings are oval but have spherical end sections, each of which might hold a spherical frame of the type of FIGS. 1 and 2, for example. Buildings of the geodesic type, although self-supporting, are commonly provided with some sort of support structure or internal frame which, in turn, can be cross connected or braced with the frame of internal dome screens if desired. Such a cross braced structure is shown in FIG. 16 wherein outer frame members 106, which may be chordal or curved, are connected together through a cross brace member 108 using connecting members 110. The screen frame in this instance is shown as having adjacent beams 112, which may be chordal or curved, connected to the cross brace 108 by a similar connecting structure arrangement 114. The diagonal cross bracing 116 connected to beams 112 may either extend to beams 106 or some other structure to provide additional rigidity. Of particular interest in this situation is the adjustable support means generally designated 118 which consists of a fixed support member 120 supported on the end of the cross brace 108 to receive the head of a threaded bolt 122. Bolt 122 is engaged at the other end by threaded sleeve 124. Sleeve 124 is in effect a turnbuckle which has a similar structure at the opposite end. The head of another oppositely threaded bolt 126 is engaged by a fixed support 120 fixed to a supporting cross head 128. Since the screws 122 and 126 are of opposite thread, turning the sleeve 124 in one direction will shorten the space between the members 120 and 128 and turning it in the opposite direction will increase the distance thereby providing an easily adjustable member. Cross head 128, in turn, is engaged in track 130 which is a resilient deformable member supported by a plurality of turn-buckle arrangements similar to 118 and allowing adjustment of the curvature to permit conforming to a section of screen to be attached thereto on the lower side of track 130.

Figure 17:
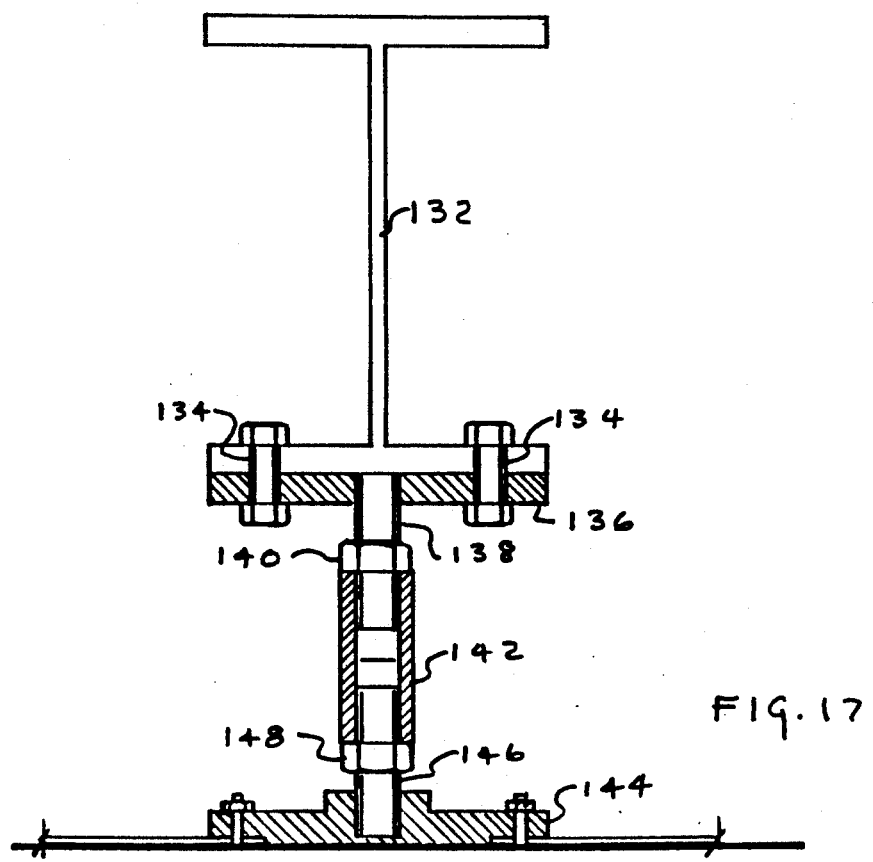
FIG. 17 is a view similar to FIG. 16 which shows another alternative type of frame using either chordal or curved structure members and another version of the screen support structure of FIG. 16.

A variation of this structure is seen in FIG. 17 wherein an I-beam 132, providing a structural member, is connected by bolts 134 to a plate 136 carrying a threaded stud 138 which engages nut 140, in turn, fixed to sleeve 142 which serves the same function as sleeve 124 in FIG. 16. In this particular construction a screen or other surface receiving member 144 is connected by a fixed oppositely threaded stud 146 through a nut 148 fixed to the other end of sleeve 142. Thus rotation of the sleeve 142 in one direction will move the oppositely threaded studs 138 and 146 toward one another and rotation in the opposite direction will move them away from one another, thus allowing adjustment of a supported strip 150 for carrying a screen.

Figure 18:
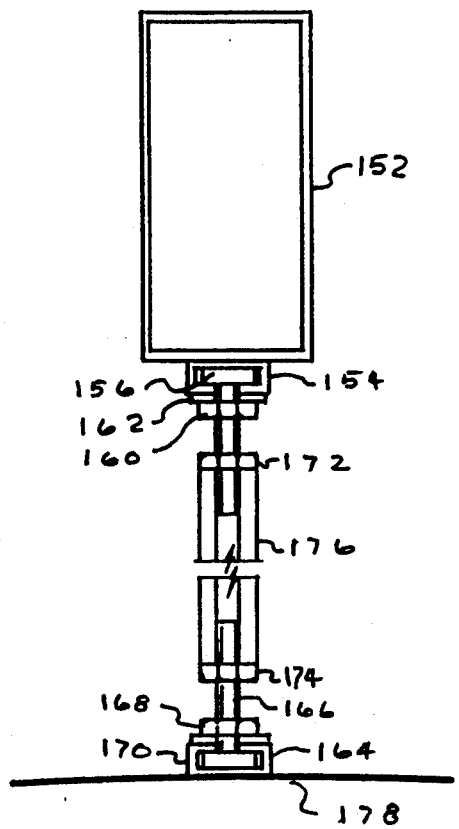
FIG. 18 shows yet another means of providing screen support similar to those of FIGS. 16 and 17 structural members such as those of the dome of FIGS. 1 and 2.

More appropriate to the hollow rectangular beams of the preferred embodiments of FIGS. 1 and 2 is the structure seen in FIG. 18. Here, for example, a longitudinal hollow rectangular tubular beam 152 is provided on its inside curved face with a track 154 which carries the head 156 of a bolt 158. A washer 162 is slipped over the threaded shank of bolt 158 and nut 160 is tightened against the washer to pull the head 156 toward the washer 162 thereby clamping the sides of the track 154 between the washer and bolt head. Similarly, on the opposite end, a track 164 carries the head of an oppositely threaded bolt 166 on which a nut 168 engages the threaded shank and pushes a washer 170 toward the head of bolt 166 to clamp the structure against the track. The threaded bolts 158 and 166 are both respectively engaged in nuts 172 and 174 fixed to tubular member 176. Therefore, since the bolts 158 and 166 are threaded in opposite directions, turning the tubular member 176 will pull the threaded members toward one another or press them away from one another, thus permitting adjustment of a point of support of screen 178.

Figure 19:
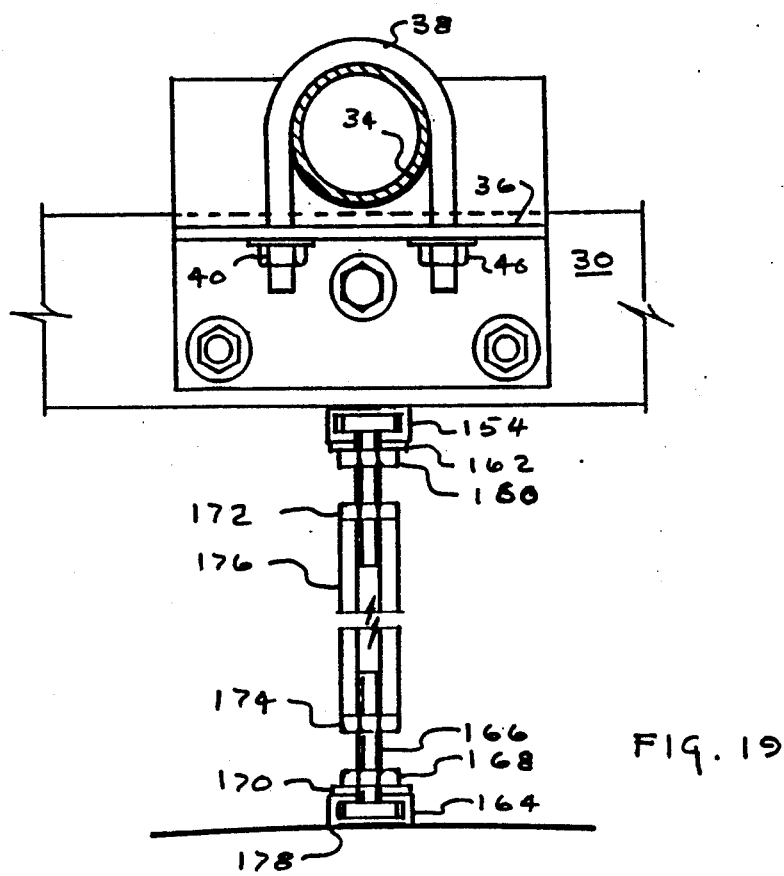
FIG. 19 shows another alternative form of screen support useful with frame constructions of the present invention.

An alternative structure for the bracket of the type shown in FIG. 18 which has parts numbered to correspond to those in FIG. 3 is shown in FIG. 19. The structure as shown in FIG. 18 is duplicated in FIG. 19 and corresponding numbers are used thereon simply to indicate that different means of support are possible.

Figure 20:
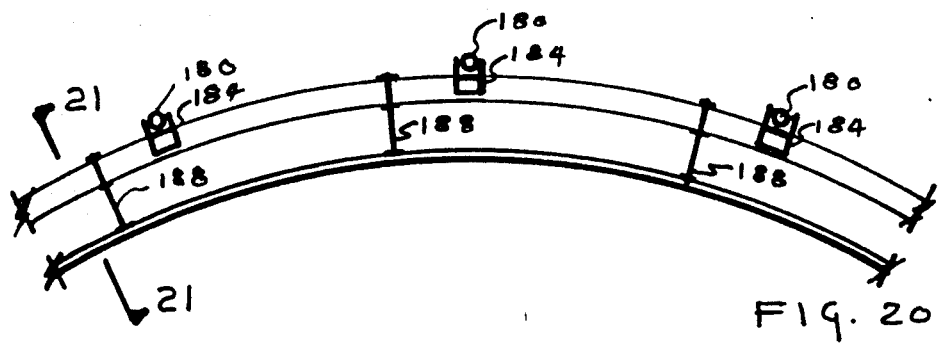
FIG. 20 is a diagrammatic view of a supporting member of a frame which employs a resilient supporting strip to conform to a supported panel.
Figure 21:
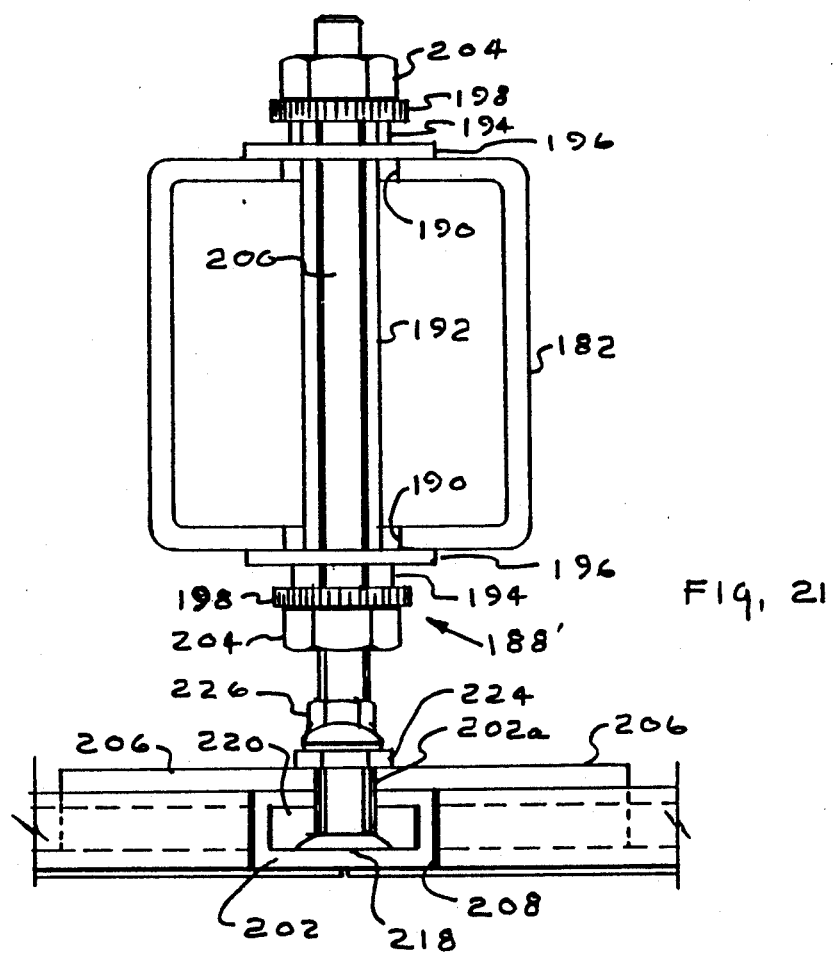
FIG. 21 is a partical sectional view taken along line 21—21 of FIG. 20 but showing a practical structure in greater detail.

FIG. 20 shows a portion of a frame in accordance with the present invention in which elongated round section structural members 180 are connected to rectangular cross section structural member 182 by bracket members 184 of the type shown in FIGS. 3 and 4. Also shown is a resilient strip 186 connected at a plurality of support points to adjustment means 188. The details of the adjustment means are shown in FIG. 21 will be discussed in connection therewith. However, since the concept of the adjustment means has been discussed above, the primary comment of interest in this case is that the resilient strip is here closely conforming to the frame member 182 from which it is supported. Therefore, in this particular instance the purpose of the adjustment means is to provide refinement to the curvature of the resilient strip 186 to make it more closely conform to the shape of the panels and with the inside surface of beam 182. It should be understood, of course, that in many instances the support member may not conform to the screen curvature and, in fact, support members may be straight segments. In such events the resilient strip and the adjustment means will, of course, provide the conforming surface to which the edges of the panels may be secured by adhesive or by riveting or otherwise.

Referring now to FIG. 21, the adjustment means 188 is more complex than that shown in FIG. 20. The adjustment means is sometimes known as a compliant connector and in this particular instance deserves that name because adjustment may not just be made longitudinally as in other instances described, but laterally in every direction as well and rotationally by virtue of the particular type of coupling to the resilient strip. The support member 182 is of rectangular or square section and in this case the connector is made to pass directly through the beam. In order to permit lateral adjustment in every direction enlarged holes 190 are provided. Immediately inside the opening is a tubular member 192 which provides a hollow spacer whose outside surfaces is threaded to receive nuts 194 which thread onto the outer surface of tube 192 and are limited in their movement toward one another by large washers 196 which are substantially larger than the holes 190. When nuts 194 are loosened the whole compliant connector 188 moves with the hollow spacer 192 to be repositioned in a desired lateral direction. The move is possible in any lateral direction. When the lateral position desired is achieved the nuts 194 are tightened against the sidewalls of the support member 182 and they will be held in this position. This may be done using an additional nut 198 outside the nuts 194 as lock nuts to ensure against movement once a desired position has been achieved. Passing through the tubing 192 and beyond it in both directions is the threaded bolt 200 or jack screw. The jack screw is connected to the flexible member and its position, sometimes called the radial position, in and out toward the flexible strip 202 is controlled by the jack nuts 204 which engage the threaded outer surface of the jack screw 200. It will, of course, be understood that jack nuts 204 must be loosened before the lock nuts 198 and nuts 194 can be loosened to make the lateral adjustment. Once the lateral adjustment is achieved, however, the so-called radial adjustment involves moving the jack screw 200 in or out as desired by appropriate movement of the jack nuts 204. When the desired position is achieved, the jack nuts 204 are tightened against the lock nuts 198 which effectively are rigidly connected to the support member 182 so that the jack screw 200 is rigidly supported relative thereto.

Figure 22:
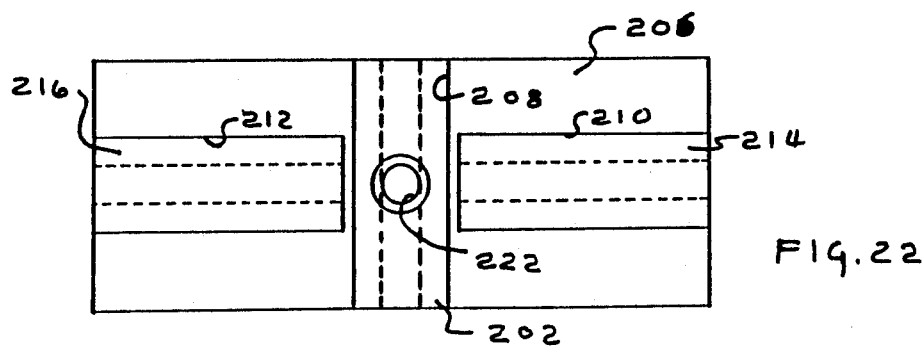
FIG. 22 is a plan view from below of the supporting block for resilient strips shown in FIG. 21.

In this particular situation a more complicated than usual situation is shown where flexible strips for mounting panels effectively cross one another. To provide for this an enlarged block 206 is provided with one transverse channel 208 seen in the bottom view in FIG. 22 of block 206 and two transverse channels 210 and 212. Channel 208 contains the flexible strip 202 which extends clear through the structure. Channels 210 and 212 contain flexible strips 214 and 216 which terminate in the channels 210 and 212. Each of the flexible strips is preferably made in such a way as to create a rectangular hollow of uniform cross section and a uniform slot or keyway 202a, in the case of flexible strip 202, throughout the length. The jack screw 200 terminates in a pivot head 218 which presents a spherical surface below the threaded shank of the jack screw. The spherical surface can rotate within a spherical bearing 220 which is made as a block which fully occupies the rectangular core of the flexible member 202 over a short distance of its length. The jack screw is assembled through the bearing and slid into the flexible member. Thereafter, the jack screw before it is connected to all of the structure above will pass through the hole 222 when the structure has been properly positioned. The center hole through the bearing and the hole 222 are sufficiently large to allow some rotation of the jack screw in the spherical bearing about its pivot head 218. The structure is clamped securely in position using a washer 224 which is considerably larger than the hole 220 and a spherical nut 226. The spherical nut 226 is a two piece member also permitting some angular accommodation which is also permitted by the clearance within the bearing 220 and the hole 202a. In other structures a member the equivalent of plastic member 206 would be simpler and smaller and accommodate only a single resilient strip. However, in other situations resilient strips may come together at different angles other than generally normal to one another as in this case.

The applicant has described various embodiments of the present invention including a number of detailed features which vary considerably from one another. Certain types of structure applies to almost any kind of construction shown and described in the application. On the other hand, there are aspects of the various areas of invention that are broader than the specific embodiment shown. For example, polygonal cross section structural members have been described throughout, but only rectangular and square cross section polygonal members have been shown. It will be obvious that other polygonal cross sectional members could be used and where parallel faces are provided the clamp of FIGS. 5 and 6 can be used with them.

Other variations of the invention, not shown, will be clearly understood to be variants and to the extent that they are within the scope of the claims herein they are within the scope and spirit of the present invention.

We claim:

1. A support frame for supporting a surface generally conforming to the frame comprising:
   a plurality of first elongated rounded cross section structural members arranged generally parallel to one another;
   at least one second elongated polygonal cross section structural member arranged transverse to the first structural members having at least a pair of parallel faces;
   a pair of separate bracket members having at least a pair of planar surfaces for application to opposed parallel faces of the polygonal cross section member, each having a rounded groove at one edge generally conforming to the rounded cross section structural member;
   means to hold the bracket members to the planar surfaces and to one another so that the rounded grooves are aligned; and
   clamp members cooperating with the bracket members to engage the rounded cross section member to hold the rounded member in the grooves.

2. The support frame of claim 1 in which each of the brackets is provided with a flange generally normal to the planar surface, each flange supporting a clamp member and projecting from the opposite side from the planar surface when assembled to the opposed parallel faces of the polygonal cross section members in which the clamp members are U-shaped members of a size and orientation relative to the flange to engage the rounded cross section member positioned in the rounded grooves when the bracket members are mounted to the respective parallel surfaces of the polygonal cross section member.

3. The support frame of claim 2 in which the U-shaped members are U-bolts which extend through holes in the flanges and the respective threaded ends engage nuts which enable the U-bolts to be tightened against the rounded cross section member to clamp that member securely in the groove of the bracket.

4. The support frame of claim 3 in which the brackets are provided bolt holes placed so that bolts securing the brackets in place will pass through the parallel faces of the polygonal cross section member and nuts may engage the bolts to hold both brackets in place securely and rigidly against the parallel faces of the polygonal cross section member.

5. A clamping system for connecting a polygonal cross section member having at least a pair of parallel surfaces to rounded cross section member comprising:
   a pair of separate bracket members having planar surfaces for application to opposed parallel faces of the polygonal cross section member, each bracket having a rounded groove at one edge generally conforming to the rounded cross section member;
   means to hold the bracket members to the planar surfaces and to one another so that the rounded grooves are aligned; and
   clamp members cooperating with the bracket members to engage the rounded cross section member to hold the rounded member in the respective grooves.

6. The clamping system of claim 5 in which each of the brackets is provided with a flange generally normal to the planar surface and projecting from the opposite side from the planar surface, each flange supporting a clamp member wherein the clamp members are U-shaped members of a size and orientation relative to the flange to engage the rounded cross section member positioned in the rounded grooves when the bracket members are mounted to the respective parallel surfaces of the polygonal cross section member.

7. The clamping system of claim 6 in which the clamping members are U-shaped members having cooperative means which engage the flanges.

8. The clamping system of claim 7 in which the U-shaped members are U-bolts the generally parallel ends of which extend through holes in the flanges and the respective threaded ends thereof engage nuts which bear against the flanges and enable the U-bolts to be tightened against the rounded cross section member.

9. The clamping system of claim 6 in which the brackets are provided with bolt holes through which can pass bolts for securing the brackets to the parallel sides of the polygonal cross section member.

10. The clamping system of claim 9 in which the bolt holes through the brackets are placed so that bolts will pass through the parallel sides of the polygonal cross section member and both brackets and may engage the bolts to hold the brackets in place.

11. The clamping system of claim 4 in which the polygonal cross section is rectangular and the rectangular cross section members each have parallel surfaces which together with corresponding surfaces of the other rectangular members generally define a surface which conforms to the shape of a structure to be supported.

12. The clamping system of claim 11 in which the supported structure is a screen which is supported on said conforming surfaces of the rectangular members.

* * * * *

UNITED STATES PATENT AND TRADEMARK OFFICE
CERTIFICATE OF CORRECTION

PATENT NO. : 5,181,355
DATED : January 26, 1993
INVENTOR(S) : LEONARD P. SKOLNICK It is certified that error appears in the above-identified patent and that said Letters Patent is hereby corrected as shown below:

Claim 10, Column 12, line 42, after "and" (second occurrence) insert --nuts--.

Signed and Sealed this

Twenty-sixth Day of April, 1994

Attest:

BRUCE LEHMAN

Attesting Officer   Commissioner of Patents and Trademarks